(12) United States Patent
Reinhold

(10) Patent No.: US 6,540,806 B2
(45) Date of Patent: Apr. 1, 2003

(54) FILTER WITH A CYLINDRICAL HOUSING AND AN ANNULAR FILTER CARTRIDGE

(75) Inventor: Thomas Reinhold, Zaragoza (ES)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/960,733

(22) Filed: Sep. 24, 2001

(65) Prior Publication Data

US 2002/0040569 A1 Apr. 11, 2002

Related U.S. Application Data

(63) Continuation of application No. PCT/EP00/02530, filed on Mar. 22, 2000.

(30) Foreign Application Priority Data

Mar. 24, 1999 (DE) .......................... 199 13 181

(51) Int. Cl.⁷ .......................... B01D 46/02; B01D 46/10
(52) U.S. Cl. .......................... 55/490; 55/385.3; 55/492; 55/498; 55/502; 55/503; 55/510; 55/521
(58) Field of Search .............................. 55/385.3, 492, 55/498, 500, 501, 502, 503, 509, 510, 529, DIG. 28, 521, 490; 123/198 E

(56) References Cited

U.S. PATENT DOCUMENTS

| | | | | |
|---|---|---|---|---|
| 3,870,495 A | * | 3/1975 | Dixson et al. ................ | 55/521 |
| 4,063,913 A | * | 12/1977 | Kippel et al. ................ | 55/498 |
| 4,065,276 A | * | 12/1977 | Nakaya et al. ................ | 55/492 |
| 4,278,455 A | * | 7/1981 | Nardi .......................... | 55/492 |
| 4,482,368 A | * | 11/1984 | Roberts ....................... | 55/502 |
| 4,498,915 A | * | 2/1985 | Witchell ...................... | 55/498 |
| 4,588,426 A | * | 5/1986 | Virgille et al. ............... | 55/498 |
| 4,758,256 A | * | 7/1988 | Machado ..................... | 55/498 |
| 5,173,186 A | * | 12/1992 | Spafford et al. .............. | 55/502 |
| 5,685,985 A | * | 11/1997 | Brown et al. ................. | 55/498 |
| 5,720,788 A | * | 2/1998 | Puckett et al. ............. | 55/385.3 |
| 5,730,769 A | | 3/1998 | Dungs et al. | |
| 5,736,045 A | * | 4/1998 | Bies et al. .................... | 55/502 |
| 5,762,796 A | * | 6/1998 | Zraik .......................... | 55/500 |
| 5,954,849 A | * | 9/1999 | Berkhoel et al. ............. | 55/498 |
| 6,312,491 B2 | * | 11/2001 | Coulonvaux ................ | 55/498 |

* cited by examiner

Primary Examiner—Duane Smith
Assistant Examiner—Jason M. Greene
(74) Attorney, Agent, or Firm—Crowell & Moring LLP

(57) ABSTRACT

A filter including a housing made up of two housing shells in the form of mating cylindrical vessels (12, 12a) in one of which a support tube (17), especially a support tube having a conical shape, is integrated. A conical annular filter cartridge, preferably one having a resilient axial play compensating element (21) at one end, is installed on the support tube (17). The housing shells (12, 12a) are joined by a central screw connection (22), and sealing between the housing shells is effected by a labyrinth seal (14, 15). The filter is able to adapt to tolerance variations in the axial length of the individual components, so that productions costs are kept low. The housing shells (12, 12a) are constructed in such a way that they can be manufactured using simple casting molds with no undercuts. The occurrence of undercuts is avoided by designing the lattice-like support tube (17) with a conical shape so that there is a radial distance "a" between adjacent circumferential struts (29) of the support tube lattice.

11 Claims, 1 Drawing Sheet

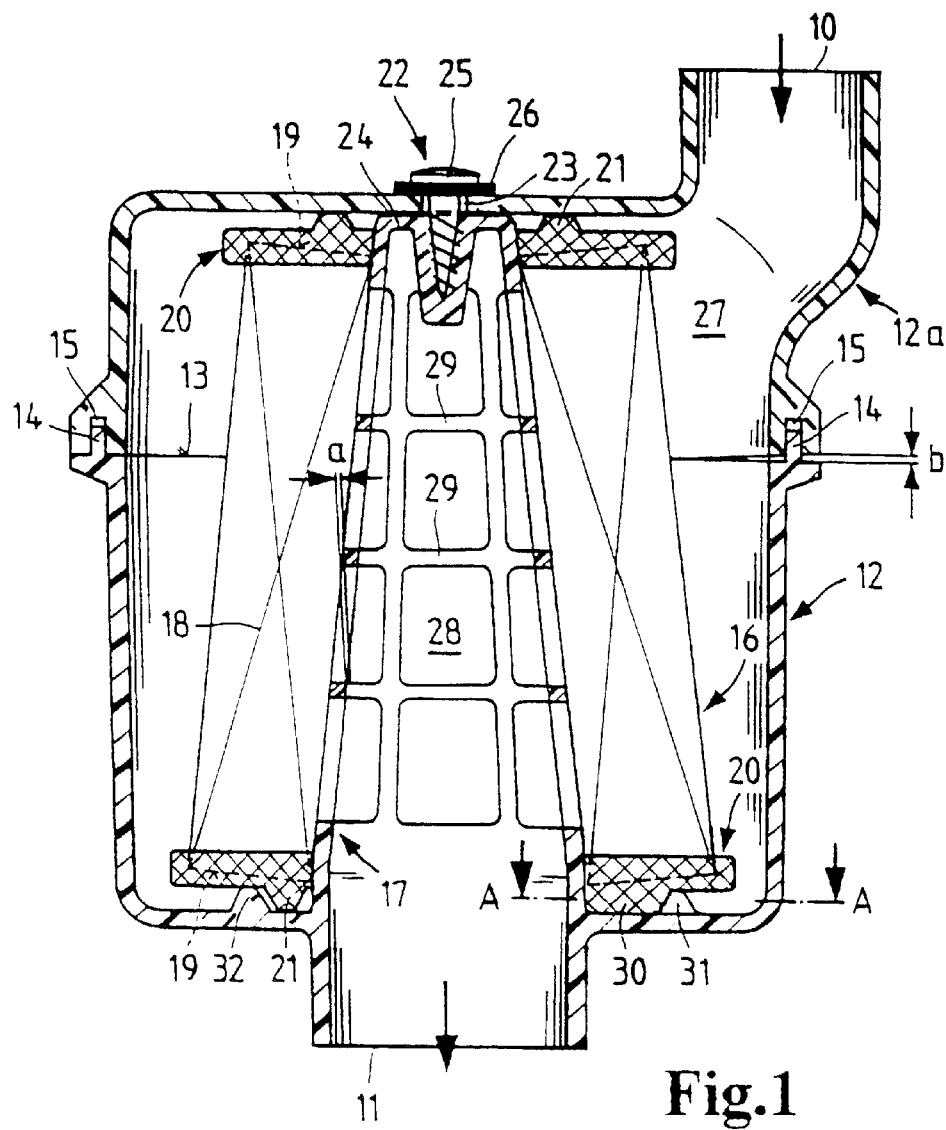
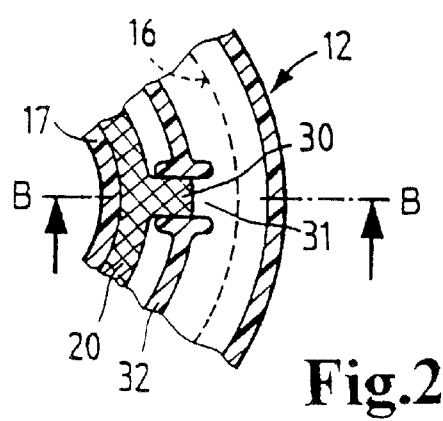

FILTER WITH A CYLINDRICAL HOUSING AND AN ANNULAR FILTER CARTRIDGE

CROSS REFERENCE TO RELATED APPLICATIONS

This application is a continuation of international patent application no. PCT/EP00/02530, filed Mar. 22, 2000, designating the United States of America, the entire disclosure of which is incorporated herein by reference. Priority is claimed based on Federal Republic of Germany patent application no. 199 13 181.3, filed Mar. 24, 1999.

BACKGROUND OF THE INVENTION

The invention relates to a filter, particularly an air filter for the intake air of internal combustion engines, comprising a housing in the form of a cylindrical vessel and an annular filter cartridge fixed to a support tube. The invention further relates to an annular filter cartridge which is suitable for installation in the aforementioned filter.

The use of annular filter cartridges in cylindrical vessel housings is known, for instance, from Dungs et al., U.S. Pat. No. 5,730,769. According to this prior patent, an annular filter cartridge is installed in a cylindrical vessel housing, which can be separated into two housing halves for this purpose. Furthermore, to protect the annular filter cartridge against collapse of the filter medium if the pressure difference between the unfiltered side and the filtered side becomes too great, a support tube may be mounted in the interior of the annular filter cartridge.

The installation of the support tube into one of the housing shells, however, increases the effort and cost of assembling the filter. In addition, a fit must be provided to fix the support tube inside the housing shell. This results in certain requirements regarding the dimensional accuracy of the housing components. The same applies also to the division of the housing into two housing shells. For reasons of cost, however, such cylindrical vessel housings are often made of synthetic resin material, i.e., plastic. The higher the requirements for dimensional accuracy, the lower is the cost advantage resulting from the selection of this material. This applies likewise to the parting line between the housing shells, which according to the aforementioned document must be bridged by several snap locks to achieve a sufficient seal between the housing parts.

SUMMARY OF THE INVENTION

It is thus an object of the invention to provide a filter, which can be produced at low cost and nevertheless is functionally very reliable.

It is also an object of the invention to provide a filter which allows for large tolerances in the manufacture of the individual components and at the same time is functionally reliable.

A further object of the invention is to provide a filter cartridge for use in a filter of the aforedescribed type.

These and other objects have been achieved in accordance with the invention by providing a filter comprising a housing having an inlet and an outlet for a fluid medium to be filtered, said housing comprising two housing shells and an axially extending support tube with a lattice structure formed integrally in one piece with one of said housing shells, and an annular filter cartridge disposed on said support tube inside said housing such that fluid from said inlet must pass through said filter to reach said outlet, wherein said support tube and said filter insert have mating conical configurations.

In accordance with a further aspect of the invention, the objects are also achieved by providing an annular filter cartridge comprising a filter paper strip star-folded to form a pleated tubular filter member defining an axially extending central passageway and having axial ends embedded in end disks, wherein said central passageway is conically tapered.

The filter according to the invention conventionally comprises a housing in the form of a cylindrical vessel in which an annular filter cartridge is installed to form a seal in such a way that the fluid to be filtered flows from a housing inlet through the filter element to a housing outlet. One of the housing shells forms a single, unitary part together with a support tube which is provided to receive the filter cartridge. This component can be produced in a single process step, for example, as an injection molded plastic part. This saves separate molds that would otherwise be required for the support tube. It also eliminates the necessity of mounting the support tube in one of the housing shells. Additional seals between the support tube and the housing shell are also unnecessary. Moreover, an assembly step is eliminated.

In accordance with one advantageous embodiment of the inventive concept, the support tube and the annular filter cartridge are conical. The support tube is designed in such a way that there are no undercuts as seen in axial direction of the cylindrical housing. Because of the lattice-type structure of the support tube, this is only possible with a conical shape. A cylindrical shape would necessarily cause undercuts in axial direction since the individual struts around the circumference would lie on top of each other in axial direction. The conical shape, however, results in a distance (a) between two respectively adjacent circumferential struts, so that if the remainder of the cylindrical housing is designed accordingly, the mold for the housing shell with the support tube requires only two mold halves. These mold halves are then opened and closed in axial direction of the housing shells. Thus, the design of the housing shell according to the invention substantially simplifies the mold. Particularly in plastic injection molds, this clearly increases the economic efficiency of the filter because the molds are expensive, even if the number of units produced is large.

The conical design of the support tube also shows clear advantages in the mounting of the filter cartridge. The cartridge can be readily installed in the housing shell having the support tube, since the support tube and the cartridge make contact only after the cartridge has been completely inserted. This also avoids any possible damage to the sealing areas at the end disks of the cartridge by the struts of the lattice. In the installed position, the annular filter cartridge is then automatically centered.

It is advantageous to use a filter paper folded into a star shape as the filter medium for the annular filter cartridge. The filter paper can be produced at low cost by folding it from a rectangular filter strip. When it is subsequently brought into a conical shape to produce the conical cartridge, the plane of the end faces of the star-shaped bellows will be conically distorted. This can be readily compensated, however, by end disks. These end disks can be produced, for example, from a resilient or elastic material, particularly polyurethane foam. Selecting a rectangular filter strip as the semi-finished product for the annular filter cartridge has the advantage that conventional machines can be used for the folding process. In addition, there is no waste when the filter paper is cut, provided that the dimensions are properly selected.

An alternative to reduce the production costs of the filter is to take into account possible tolerances of the components in the design of the seal. This is achieved by providing a labyrinth seal in the parting line between the housing shells. This seal can, for example, be formed by a groove in the one housing part and a corresponding annular shoulder on the other housing part. Axial tolerances in the housing parts, which would cause the sealing joint to gape, can then be compensated within an axial area (b), which is a function of the groove depth. Radial tolerances, e.g., out-of-roundness of the housing shells, can also be compensated by a positive guidance of the labyrinth seal in radial direction. The design of the seal according to the invention thus permits a larger tolerance range in the production of the housing shells. This makes it possible to produce the molds at lower cost and to reduce the material requirements for the housing. This sealing system between the housing shells substantially simplifies the assembly means required for joining the two housing shells. Since axial sealing pressure in the parting line between the housing shells is unnecessary because the sealing pressure is produced radially between the groove and the annular collar, it is sufficient to provide, for example, a central screwed connection in the area of the cover which engages with a seat in the support tube. As an alternative to a screw connection, other fastening mechanisms are, of course, also feasible, e.g., a bayonet connection.

To achieve a relatively large tolerance range between the housing and the filter cartridge, it is useful to provide at least one of the end disks of the round filter cartridge with a resilient, axial play compensating element. Regardless of any axial play which may occur, such an axial play compensating element will remain supported against the housing walls in the area of its elasticity. At the same time, it can provide axial sealing between the unfiltered side and the filtered side of the filter in the housing. As an alternative, or in addition thereto, such sealing can also be produced by a radial seal with respect to the support tube. The end disks can be rigid with the axial play compensating element constructed as an additional component which is mounted, e.g., glued, to the end disks. Alternatively, it is possible to use resilient or elastic end disks, which are provided with a separate area for axial play compensation. In particular, filter cartridges with polyurethane end disks can be provided with axial play compensating elements without increasing the production costs by designing the mold for the end disks accordingly.

In accordance with one advantageous embodiment of the invention, a catch nose or locking projection is provided on the cartridge, which engages in an associated recess in the housing only in a specific angular position. The annular filter cartridge can therefore be mounted inside the housing only in a certain angular position. This device enhances the functional reliability of the filter. If the filter is removed and subsequently reinstalled, for instance to clean off filtered particles, the position between housing and filter cartridge cannot be changed. This ensures a reliable seal between the unfiltered and the filtered side even after the filter cartridge is reinstalled. Otherwise, the cartridge could be installed in the housing in a different angular position. Since a so-called permanent set of the axial play compensating element will occur as a result of tolerances and different elastic deformation of the axial play compensating element, the seal or the axial play compensating element could gape open if the position of the seal or compensating element were changed. The permanent set is the amount by which particularly the axial play compensating element is plastically deformed by the tolerances in the housing.

The invention also relates to an annular filter cartridge suitable for installation suitable for installation in the filter of the invention. Installing such an annular filter cartridge provides the described advantages.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which:

FIG. 1 is a sectional view taken along line B—B of FIG. 2 through a filter with a housing in the form of a cylindrical vessel containing a conical filter cartridge; and FIG. 2 is a detailed sectional view taken along line A—A of FIG. 1.

DETAILED DESCRIPTION OF PREFERRED EMBODIMENTS

The filter according to FIG. 1 comprises a housing with an inlet 10 and an outlet 11. Outlet 11 may suitably be an air intake manifold of an internal combustion engine. The housing is comprised of two housing shells 12, 12a, which are sealed to each other by a labyrinth seal in the area of a parting line 13. This labyrinth seal comprises an annular collar 14 and a groove 15, which mesh and thereby produce a seal irrespective of any axial play (b) between housing shells 12 and 12a.

When the filter is assembled, an annular filter cartridge 16 is pushed onto a support tube 17, which is fixedly connected with housing shell 12. Both the support tube 17 and the annular filter cartridge are conical in shape. An annular filter medium 18, which in the illustrated preferred embodiment comprises a star-shaped folded filter paper, has its axial end faces 19 embedded in end disks 20 made of polyurethane foam. While the surfaces of the end disks lie in one plane, the end faces 19 of the filter medium 18 lie on the tapered surface of a cone. Thus, the thickness of the end disks must be selected large enough so that the end faces 19 are completely embedded therein. Both end disks 20 are provided with resilient, axial play compensating elements 21, which are supported against the axial end walls of respective housing shells 12 and 12a. The annular filter cartridge 16 is axially fixed on the support tube 17 via the axial play compensating elements 21 by assembling the housing shells 12 and 12a and securing a screw connection 22 comprising an attachment screw 25. Screw 25 extends through a bore 23 in housing shell 12a and engages its threads in a recess in the distal or free end 24 of the support tube 17. If desired, a seal 26 may be provided between screw 25 and bore 23.

The illustrated filter may be used, for example, to filter the intake air of an internal combustion engine. The intake air flows through inlet 10 into an unfiltered side 27 of the filter, passes through the filter medium 18 and the lattice-shaped support tube 17 and thus reaches a filtered side 28 of the filter, from whence it is discharged through outlet 11.

The housing halves 12, 12a are consistently designed in such a way that they can be produced by molding using two mold halves. The substantially cylindrical housing halves are removed from the forming molds in axial direction. Inlet 10, outlet 11, groove 15 and annular collar 14 are designed accordingly. The lattice-type support tube 17 can also be released from the mold axially because an offset is created between the individual circumferential struts 29 due to the conical shape of the support tube 17. This avoids an undercut between respectively adjacent circumferential struts.

To produce a defined relative angular position between housing shell 12 and annular filter cartridge 16, the end disk 20 that communicates with housing shell 12 is provided with a locking projection 30. This is shown in FIG. 2, where the outer circumference of the annular filter cartridge 16 is indicated by a broken line. Due to the presence of locking projection 30, the annular filter cartridge can be installed in only one angular position relative to the housing shell 12. In this angular position, the locking projection 30 communicates with a recess 31. In all other angular positions, the locking projection 30 meets an annular bead 32, so that the installer realizes that the round filter cartridge 16 cannot be completely pushed onto the support tube 17. A comparable device for ensuring a certain angular position of the cartridge inside the housing is of course also feasible in housing shell 12a. Mating projections and recesses can also be used to define the mutual angular position of the housing shells with respect to one another.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A filter comprising a housing having an inlet and an outlet for a fluid medium to be filtered, said housing comprising two housing shells and an axially extending support tube with a lattice structure, the support tube and one of said housing shells being produced in one piece as an injection molded plastic part, and an annular filter cartridge disposed on said support tube inside said housing such that fluid from said inlet must pass through said filter cartridge to reach said outlet, wherein said support tube and said filter cartridge have mating conical configurations, and wherein the lattice structure of the conical support tube includes axial and circumferential struts and an offset between two adjacent circumferential struts due to the conical configuration of the support tube so that the conical support tube is free of undercuts along its axial length.

2. A filter according to claim 1, wherein said annular filter cartridge comprises a rectangular filter paper strip star-folded to form a pleated tubular filter member defining an axially extending central passageway and having axial ends embedded in nonmetallic end disks, and wherein said central passageway is conically tapered.

3. A filter according to claim 1, wherein said housing shells are joined by an axial tolerance compensating labyrinth seal.

4. A filter according to claim 3, wherein said labyrinth seal comprises an axially extending, annular groove formed on one of said shells and an axially extending annular collar formed on the other of said shells and received in said annular groove.

5. A filter according to claim 1, wherein said shells are joined by a releasable connection between a distal end of the support tube on the one housing shell and an inner axial face of the other housing shell.

6. A filter according to claim 5, wherein said releasable connections comprises a screw extended through an aperture in the axial face of said other shell and having threads engaged in a recess in the distal end of the support tube.

7. A filter according to claim 2, wherein at least one of said end disks is provided with a resilient axial play compensating element.

8. A filter according to claim 7, wherein said resilient, axial play compensating element comprises an elastic, annular projection integrally formed on said end disk.

9. A filter according to claim 8, wherein said end disk and annular projection are integrally molded in one piece of a resilient polyurethane foam.

10. A filter according to claim 1, wherein said annular filter cartridge comprises an end disk on each axial end thereof, and one of said end disks is provided with a latching projection which engages in a recess in one of the housing shells when the filter cartridge is mounted on the support tube to fix the relative angular positions of the filter insert and the housing shell.

11. A filter according to claim 1, wherein said outlet is an air intake manifold of an internal combustion engine.

* * * * *